United States Patent [19]

Lu

[11] Patent Number: 6,121,976
[45] Date of Patent: Sep. 19, 2000

[54] DIGITAL IMAGE-PROCESSING METHOD FOR CONDUCTING COLOR GRADIENT

[75] Inventor: Kuang-Rong Lu, Taipei, Taiwan

[73] Assignee: Ulead Systems, Inc., Taipei, Taiwan

[21] Appl. No.: 08/596,028

[22] Filed: Feb. 6, 1996

[51] Int. Cl.[7] .................................................. G06T 17/00
[52] U.S. Cl. ............................................ 345/431; 345/426
[58] Field of Search ..................................... 345/418, 419, 345/428, 429, 430, 431, 432, 426

[56] References Cited

U.S. PATENT DOCUMENTS

| | | | |
|---|---|---|---|
| 5,706,415 | 1/1998 | Kelley et al. | 345/432 |
| 5,721,572 | 2/1998 | Wan et al. | 345/431 |
| 5,731,818 | 3/1998 | Wan et al. | 345/431 |
| 5,761,392 | 6/1998 | Yacoub et al. | 345/431 |

*Primary Examiner*—Cliff N. Vo
*Attorney, Agent, or Firm*—Christie, Parker & Hale LLP

[57] ABSTRACT

The present invention is related to a digital image-processing method for conducting a color gradient, which includes the steps of: (a) constructing a draft enclosed by an inner closed curve and an outer closed curve; (b) dividing the draft into a plurality of regions, each of which is enclosed by the inner closed curve, the outer closed curve, and two control lines constructed by respectively connecting a reference point located within an inner area defined by the inner closed curve with two control points located on the outer closed curve, wherein the plurality of regions are integrated to form the draft; and (c) introducing an operation to bring about a color gradient effect in each of the plurality of regions. By utilizing the present digital image-processing method to conduct a color gradient on a draft to form a color palette, no color gap will be observed.

9 Claims, 3 Drawing Sheets

DIGITAL IMAGE-PROCESSING METHOD FOR CONDUCTING COLOR GRADIENT

FIELD OF THE INVENTION

The present invention relates generally to a digital image-processing method, and more particularly to a digital image-processing method for conducting a color gradient.

BACKGROUND OF THE INVENTION

The method for conducting a color gradient is a proficient technique that is often employed in the computer-aided graphics. Many computer design software support a palette editor which allows a user to generate their own custom color palette which is used to create some beautiful effects like gradient fill effect. The traditional palette is a one dimensional bar-type color palette, as shown in FIG. 1, built by setting certain control points on it. The user can add/delete/move these control points or change the color of any control points. Colors between every two control points are measured using a linear interpolation function. There exists at least two control points, the head and tail, as shown in FIG. 2. Currently, the user can only set the colors from the head to the tail but not from the tail to the head because these colors are undefined. This limitation will make discontinuity between colors when the colors of the bar-type color palette are to be repetitively used. For example, as shown in FIG. 1, the head is an indigo blue color, the tail is a light blue color and a color gradient is conducted from the indigo blue color to the light blue color. When the bar-type color palette is again used, no color gradient effect between the light blue color (i.e. the tail) and the indigo blue color (i.e. the head) is conducted so that there exists a gap between the indigo blue color and the light blue color, which is indicated by a circle, as shown in FIG. 3.

SUMMARY OF THE INVENTION

An object of the present invention is to provide a digital image-processing method for conducting a color gradient in which no color gap will exist.

In accordance with the present invention, a digital image-processing method for conducting a color gradient includes the steps of: (a) constructing a draft enclosed by an inner closed curve and an outer closed curve; (b) dividing the draft into a plurality of regions, each of which is enclosed by the inner closed curve, the outer closed curve, and two control lines constructed by respectively connecting a reference point located within an inner area defined by the inner closed curve with two control points located on the outer closed curve, wherein the plurality of regions are integrated to form the draft; and (c) introducing an operation to bring about a color gradient effect in each of the plurality of regions.

In accordance with another aspect of the present invention, the inner closed curve and the outer closed curve are two concentric circles. Preferably, the reference point is the common center of the two concentric circles.

In accordance with another aspect of the present invention, aid operation comprises a step of defining a color value of a target line located in a certain region according to a ratio of an angle between the target line and one of the two control lines in the certain region to that between the target line and the other of the two control lines in the certain region, wherein the target line is constructed by connecting the reference point with a target point located on the outer closed curve in the certain region. The operation is executed more than once to obtain color values of different target lines to bring about the color gradient effect.

In accordance with another aspect of the present invention, the color gradient can be expressed as an HSB color space and is a function of at least one of the hue, saturation and brightness channels. The color gradient can also be expressed as an RGB color space and is a function at least one of the red, green and blue channels. In addition, the color gradient can be expressed as a CMYK color space and is a function of at least one of the cyan, magenta, yellow and black channels. Of course, the color gradient can also be expressed as any other color space such as HSL.

In accordance with another aspect of the present invention, the method is executed in a personal computer.

The present invention may best be understood through the following description with reference to the accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purpose of illustration and description only; it is not intended to be exhaustive or to be limited to the precise form disclosed.

Figure 1:
FIG. 1 shows a schematic view of a bar-type color palette of the prior art.
Figure 2:
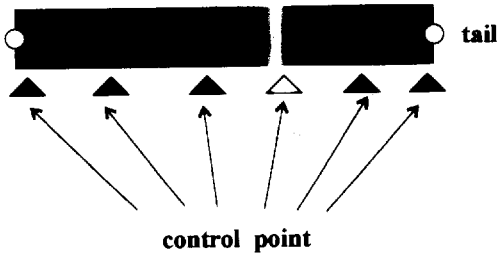
FIG. 2 shows a schematic view of a color gradient effect of the bar-type color palette of the prior art.
Figure 3:
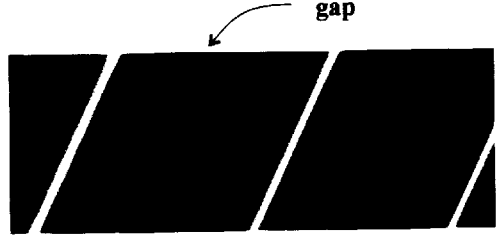
FIG. 3 is a schematic view showing a color gap between the tail color and the head color according to the prior art.
Figure 4:
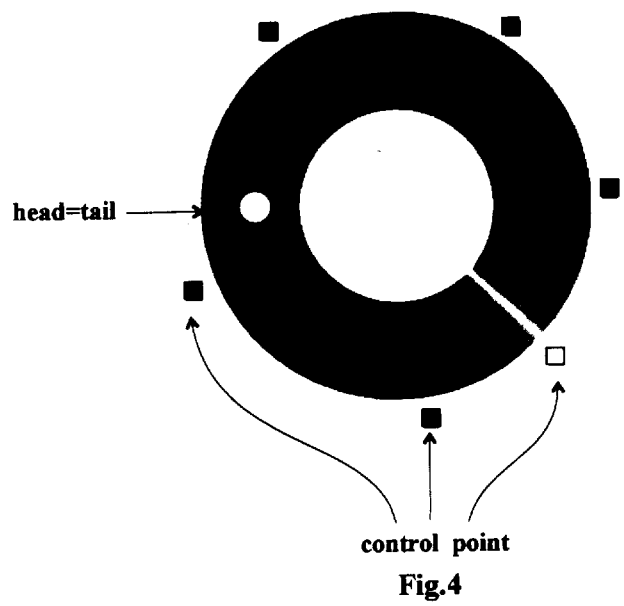
FIG. 4 shows a schematic view of a preferred embodiment of a ring-type color palette according to the present invention.

Referring to FIG. 4, a schematic view of a preferred embodiment of a ring-type color palette is shown. According to the present invention, a draft is first constructed on a computer monitor. Thereafter, a few control points connected to a reference point to form several control lines are designated to divide the draft into several regions. Then, an operation is introduced to conduct a color gradient effect in each of the regions. The operation will be illustrated more concretely below with reference to FIG. 5.

Figure 5:
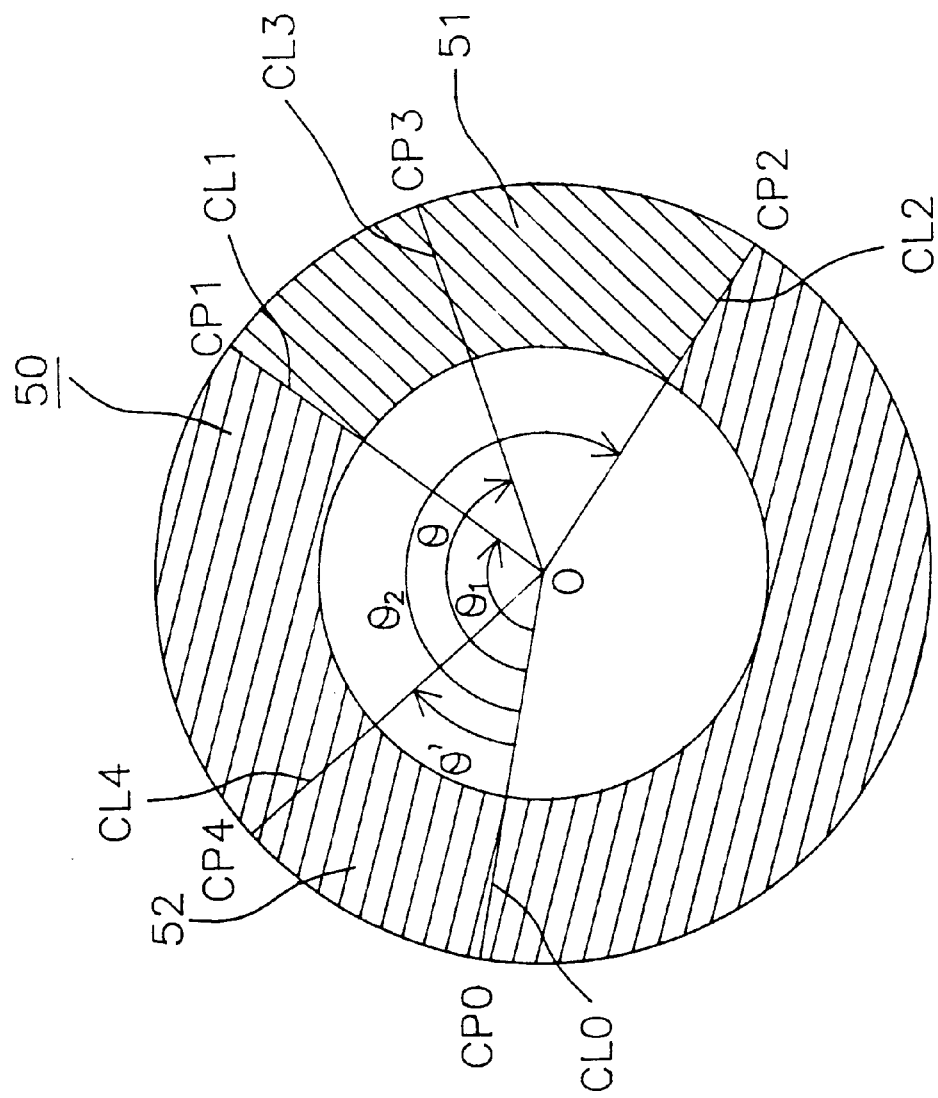
FIG. 5 shows a schematic view of the operation of the preferred embodiment according to the present invention in a case that the draft is divided into two regions.

Referring to FIG. 5, the color value of a first control line CL1 constructed by connecting the point O and the point CP1 and having an angle of $\theta_1$ clockwise from the tail-to-head line CL0 which is constructed by connecting the point O and the point CP0 and serves as an initial control line and is set to be 0 degree is known as $Color_1(,,,,Cj,,,,)$, in which Cj stands for a coordinate of the color space values. Hereon, the tail-to-head line (or the head=tail line) CL0 is chosen only for comparing the present invention to the prior art. In other words, any line on the draft 50 can be the initial control line. The color value of a second control line CL2 constructed by connecting the point O and the point CP2 and having an angle $\theta_2$ clockwise from the tail-to-head line CL0 is known as $Color_2(,,,,Cj,,,,)$. Then, the color value Color (,,,,Cj,,,,) of a line CL3 constructed by connecting the point O and the point CP3, lying within the region 51 and having an angle θ clockwise from the tail-to-head line CL0 can be determined according to the following algorithm.

Let $\theta_2 > \theta_1$, then $$Color(,,,,Cj,,,,) = \omega_1 \times Color_1(,,,,Ch,,,,) + \omega_2 \times Color_2(,,,,Cj,,,,)$$

wherein $$\omega_1 = \frac{\theta_2 - \theta}{\theta_2 - \theta_1}$$

$$\omega_2 = \frac{\theta - \theta_1}{\theta_2 - \theta_1} = 1 - \omega_1$$

According to the above algorithm, the color values of various lines having different angles clockwise from the initial control line CL0 can be determined and thereby, a color gradient can be conducted clockwise from the first control line CL1 to the second control line CL2 in the region 51.

As for the color value Color'(,,,,Cj,,,,) of a line CL4 constructed by connecting the point O and the point CP4, lying within the region 52 and having an angle θ' clockwise from the tail-to-head line CL0, it can be determined according to the following algorithms.

If $0 < \theta' - \theta_1$, $$Color'(,,,,Cj,,,,) = \omega_1 \times Color_1(,,,,Cj,,,,) + \omega_2 \times Color_2(,,,,Cj,,,,)$$

wherein $$\omega_2 = \frac{\theta_1 - \theta'}{2\pi + \theta_1 - \theta_2}$$

and $\omega_1 = 1 - \omega_2$; and

If $\theta_2 < \theta' < 2\pi$, $$Color'(,,,,Cj,,,,) = \omega_1 \times Color_1(,,,,Cj,,,,) + \omega_2 \times Color_2(,,,,Cj,,,,)$$

wherein $$\omega_2 = \frac{2\pi + \theta_1 - \theta'}{2\pi + \theta_1 - \theta_2}$$

and $\omega_1 = 1 - \omega_2$;

According to the above algorithm, the color values of various lines having different angles clockwise from the initial control line CL0 can be determined and thereby, a color gradient can be conducted clockwise from the second control line CL2 to the first control line CL1 in the region 52.

Of course, three or more control lines can be chosen for dividing the draft 50 into three or more regions, respectively, each of which is operated to be conducted therein a color gradient in a way similar to the above-mentioned algorithm to obtain a non-gapped color palette.

Figure 6:
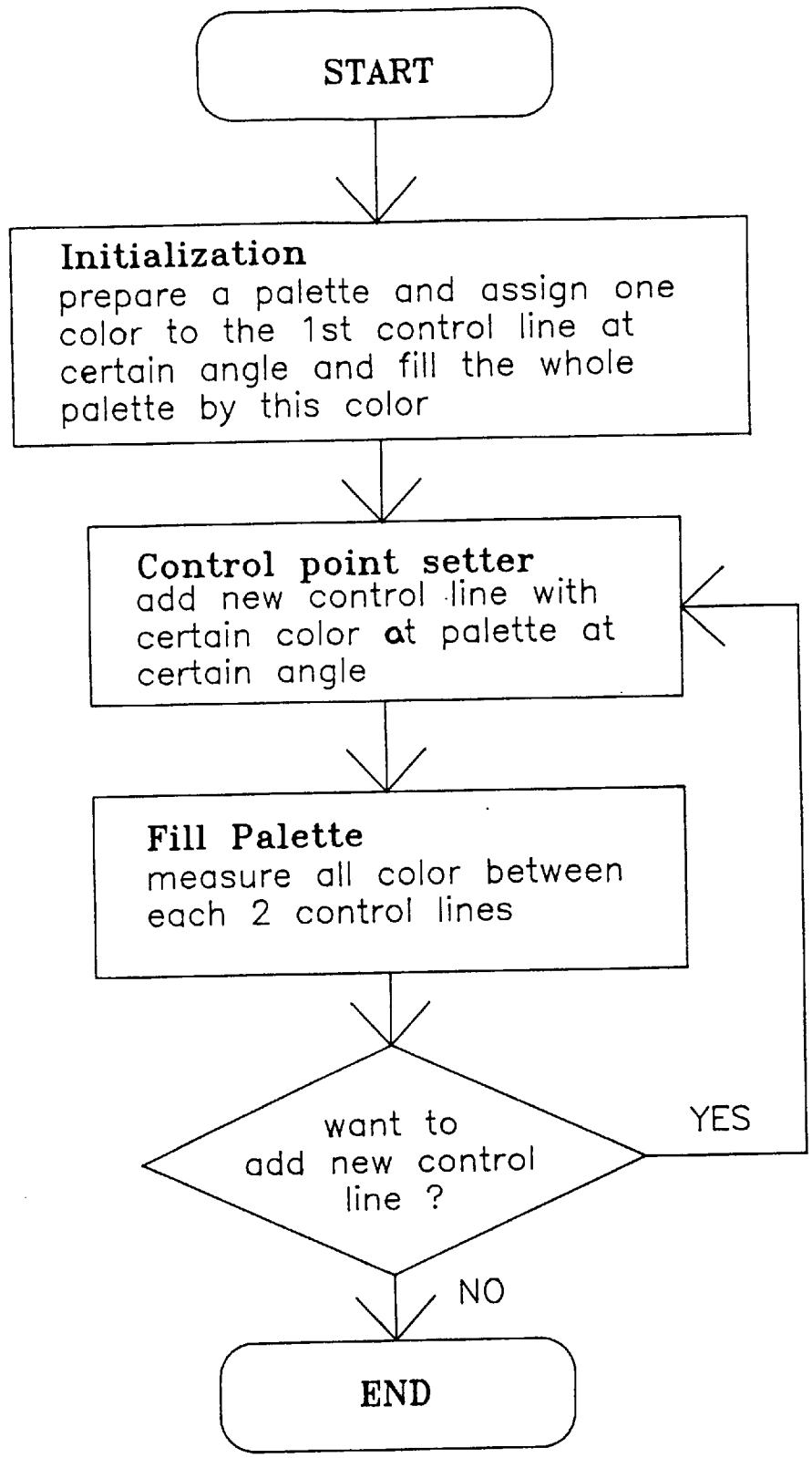
FIG. 6 is a schematic flowchart showing the digital image-processing method for conducting a color gradient according to the present invention.

A brief operating procedure of a preferred embodiment according to the present invention is summarized and shown in FIG. 6.

In a case of the present invention, the color gradient may be expressed as an HSB color space consisting of hue, saturation and brightness channels, and the color gradient is a function of at least one of the hue, saturation and brightness channels. Alternatively, the color gradient may be an RGB color space consisting of red, green and blue channels, a CMYK color space consisting of cyan, magenta, yellow and black channels or any other color space.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A digital image-processing method for conducting a color gradient, said method comprising the steps of:

(a) constructing a draft enclosed by an inner closed curve and an outer closed curve;

(b) dividing said draft into a plurality of regions, each of which is enclosed by said inner closed curve, said outer closed curve, and two control lines constructed by respectively connecting a reference point located within an inner area defined by said inner closed curve with two control points located on said outer closed curve, wherein said plurality of regions are integrated to form said draft; and (c) introducing an operation to bring about a color gradient effect in each of said plurality of regions.

2. A method as claimed in claim 1 wherein said inner closed curve and said outer closed curve are two concentric circles.

3. A method as claimed in claim 2 wherein said reference point is the common center of said two concentric circles.

4. A method as claimed in claim 1 wherein said operation comprises a step of defining a color value of a target line located in one of said plurality of regions according to a ratio of an angle between said target line and one of said two control lines to that of an angle between said target line and the other of said two control lines, wherein said target line is constructed by connecting said reference point with a target point located on said outer closed curve in one of said plurality of regions.

5. A method as claimed in claim 4 wherein said operation is executed more than once to obtain color values of different target lines to bring about said color gradient effect.

6. A method as claimed in claim 1 wherein said color gradient is expressed as an HSB color space and is a function of at least one of the hue, saturation and brightness channels.

7. A method as claimed in claim 1 wherein said color gradient is expressed as an RGB color space and is a function of at least one of the red, green and blue channels.

8. A method as claimed in claim 1 wherein said color gradient is expressed as a CMYK color space and is a function of at least one of the cyan, magenta, yellow and black channels.

9. A method as claimed in claim 1 wherein said method is executed in a personal computer.

* * * * *